Patented Sept. 17, 1946

2,407,704

UNITED STATES PATENT OFFICE 2,407,704

ANTHRAQUINONE ACID DYESTUFF

Jean G. Kern, Orchard Park, N. Y., assignor to Allied Chemical & Dye Corporation, New York, N. Y., a corporation of New York No Drawing. Application January 1, 1944, Serial No. 516,728

16 Claims. (Cl. 260—346)

This invention relates to anthraquinone acid dyestuffs. It relates more particularly to dyestuffs of the 1,4-diamino-anthraquinone acid class, and especially which are derivatives of 1,4-diamino-anthraquinone-2-sulfonic acid, in which a hydrogen atom of the 4-amino group is replaced by an aryl radical.

The dyestuffs of the present invention are derivatives of 1,4-diamino-anthraquinone acids in which an amine radical is present in the 1-position and a hydrogen atom of the 4-amino group is replaced by a heterocyclic ortho-biphenylene radical (referred to hereinafter as "a heterocyclic o-biphenylene radical"); that is, a radical formed of two benzene nuclei linked to each other directly at one nuclear carbon atom of each nucleus and linked through an inorganic atom or radical at an adjacent carbon atom of each nucleus. They include the free acids and salts thereof. Preferably they contain a carboxyl or sulfonic acid group (in the free acid or salt form) in the 2-position of the anthraquinone nucleus.

In the form of the sodium salts they are blue to green solids, soluble in water, and dyeing animal fibers and nylon from acid and neutral dye baths in level, bright blue to green shades. Their neutral solutions, particularly those containing sodium sulfate or other similar salt, dye animal fibers, nylon and related substances strong, uniform and fast shades of blue to green. (It will be understood that the term "nylon," as employed herein, includes synthetic fiber-forming linear polyamides, such as are described in United States Patents 2,071,250, 2,071,253, 2,130,523, 2,130,948, and British patent 495,790, in the form of masses, sheets, rods, fibers, textiles, or otherwise.)

The dyestuffs of the present invention are particularly valuable by virtue of their ability to produce strong and even dyeings on the aforesaid fibers when applied from a neutral dye bath containing sodium sulfate. Hence, in and for dyeing mixed fabrics, e. g., nylon-rayon, nylon-cotton, etc., the new dyestuffs may be employed simultaneously in a single dye bath with direct dyestuffs for rayon or cotton or other dyestuffs which are applicable only from a neutral or slightly alkaline dye bath. The dyestuffs of the present invention, when applied from a neutral dye bath, are also valuable for producing union shades on mixed fabrics composed of nylon and animal or other proteinic fibers (e. g., wool, silk, Aralac, soybean, etc.).

In the form of the salts of metals other than those of the first group of the periodic table (for example, barium, tin, lead, aluminum, calcium, strontium, magnesium, copper, chromium, nickel, etc.) which, for convenience are termed "lakes," they are insoluble or difficultly soluble in water; but their aqueous dispersions dye animal fibers and nylon, especially the latter, shades which are unusually brighter and clearer than those obtained with the corresponding water-soluble modifications.

The 1-position of the anthraquinone nucleus of the dyestuffs may be occupied by an unsubstituted amino radical or by any of a number of substituted amino radicals, all of which are included herein within the generic term "an amine radical." Thus, one or both of the hydrogens of the NH2 group in the 1-position may be replaced by an alkyl, aryl, aralkyl, hydroaryl, cycloalkyl, or heterocyclic radical.

The heterocyclic o-biphenylene-amine radical in the 4-position of the anthraquinone nucleus may be any of various amino derivatives of the heterocyclic o-biphenylenes, whether containing additional substituents in the phenyl nuclei or not (that is, derivatives of amino heterocyclic o-biphenylenes in which one or both of the benzene nuclei of the biphenylene radical are further substituted or unsubstituted).

Thus, the dyestuffs of the present invention include compounds which, in the form of the free acids, correspond with the following formula:

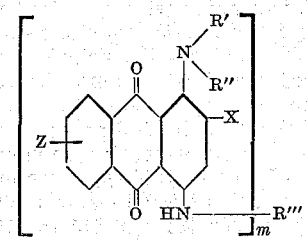

wherein R' is a member selected from the class consisting of hydrogen and alkyl, aralkyl, cycloalkyl, aryl, hydroaryl, and heterocyclic radicals, R'' is a member selected from the class consisting of hydrogen and alkyl, aralkyl, cycloalkyl, aryl, hydroaryl, and heterocyclic radicals, X is a member selected from the class consisting of halogen, the carboxyl group and the sulfonic acid group, Z is a member selected from the class consisting of hydrogen, the carboxyl group and the sulfonic acid group, at least one of X and Z being a carboxyl group or a sulfonic acid group, $m$ is one of the integers 1 and 2, and R''' is a member selected from the class consisting of heterocyclic o-biphenylene radicals corresponding with the following formula and their alkyl, alkoxy, aryl, halogen, and sulfo (e. g., sulfonic acid, sulfonamide, substituted sulfonamide, etc.) derivatives, attached through a nuclear carbon atom of the heterocyclic o-biphenylene radical to the nitrogen atom of the amino group represented by HN—:

wherein Y is a member of the class consisting of O, S, NH, N-alkyl, $SO_2$ and SO.

Those dyestuffs are of particular importance which contain an —$NH_2$ group in the 1-position of the anthraquinone nucleus, a sulfonic acid group in the 2-position of the anthraquinone nucleus, and an amino heterocyclic o-biphenylene radical (especially, one which contains no water-solubilizing group) in the 4-position of the anthraquinone nucleus.

The dyestuffs of the present invention can be prepared by condensing a mono- or di-amino heterocyclic o-biphenylene with an anthraquinone acid (such as an anthraquinone sulfonic acid or an anthraquinone carboxylic acid) having an amine radical in the 1-position of the anthraquinone nucleus and a halogen atom in the 4-position of the anthraquinone nucleus, with the aid of a copper condensation catalyst. The anthraquinone sulfonic acid dyestuffs may also be obtained by condensing a mono- or diamino heterocyclic o-biphenylene with a dihalogen aminoanthraquinone having an amine radical in the 1-position of the anthraquinone nucleus, a halogen atom in the 4-position of the anthraquinone nucleus and another halogen atom in another position (preferably the 2-position) of the anthraquinone nucleus, with the aid of a copper condensation catalyst, followed by conversion of the resulting amino-halogen-anthraquinone-amino heterocyclic o-biphenylene to the corresponding sulfonate by treatment with a sulfite or bisulfite.

In the production of the dyestuffs of the present invention, in accordance with the preferred method of procedure, an amino heterocyclic o-biphenylene is reacted with an alkali metal salt of 1-amino-4-brom-anthraquinone-2-sulfonic acid (so-called "bromamine acid"), or an alkali metal salt of 1-amino-4-bromo-anthraquinone-2-carboxylic acid, in an aqueous reaction medium containing an acid binding agent and a copper catalyst of the type usually employed in condensation reactions of this type, preferably at a temperature of about 70° to about 100° C. and especially at temperatures of 75° to 85° C.

Thus the reaction may be carried out by heating an aqueous reaction mixture containing about equimolecular amounts of the anthraquinone compound and a monoamino heterocyclic o-biphenylene (preferably with a small excess of the amino heterocyclic o-biphenylene), or two molecular amounts of the anthraquinone compound and about one molecular amount of a diamino heterocyclic o-biphenylene (preferably with a slight excess of the anthraquinone compound), an acid-binding agent (such as sodium carbonate, sodium acetate, etc.), and a catalyst (such as powdered copper, cuprous or cupric salts, etc.), cuprous salts (e. g., cuprous chloride) being preferred. The reaction mixture also may contain a water-soluble organic solvent (e. g., methyl or ethyl alcohol, diethylene glycol, dioxan, etc.); and, when employing a diamino heterocyclic o-biphenylene, the reaction mixture preferably includes a water-soluble solvent to ensure condensation of more than one mol of the anthraquinone compound with each mol of the diamino heterocyclic o-biphenylene. After the condensation is completed, the resulting dyestuff is recovered in the form of the free acid by acidifying the reaction mixture, followed by filtration. It is preferably purified by washing with dilute acid or hot saline solution. It may also be purified by repeated dissolution in water and/or alcohol or other appropriate solvent and crystallization in the form of the sodium salt.

For the production of the dyestuff "lakes" of the present invention, the dyestuff may be reacted in aqueous solution with a water-soluble salt or other compound of a metal of the type referred to above, and the resulting precipitate recovered by filtration.

The invention will be illustrated by the following specific examples, but it is to be understood that it is not limited to the details thereof and that changes may be made without departing from the scope of the invention. The temperatures are in degrees centigrade and the parts and percentages are by weight.

*Example 1.*—A mixture of 5 parts of 2-amino-dibenzofuran, 5 parts of soda ash, 0.5 part of cuprous chloride, and 250 parts of water is heated to 75° until homogeneous, after which 10 parts of sodium 1-amino-4-brom-anthraquinone-2-sulfonate are added over a period of 10 to 15 minutes. The mixture is agitated at 75° to 85° for about 6 hours to complete the condensation. During the first few hours, 1 part of cuprous chloride is added to the reaction mixture in 5 equal portions at equal intervals. The resulting reaction mass is rendered slightly acid to Congo red test paper with hydrochloric acid and filtered. The filter cake is washed with dilute hydrochloric acid until the filtrate appears colorless. The dyestuff is further purified by dissolving it in water and adding soda ash and salt to the solution to isolate the dyestuff as the sodium salt.

The resulting product is a blue crystalline solid which is sparingly soluble in cold water and soluble in hot water, and which dyes wool, silk and nylon, from acid and neutral dye baths, level bright blue shades of good tinctorial strength and fastness to light and washing. In the form of the free sulfonic acid, it corresponds with the formula:

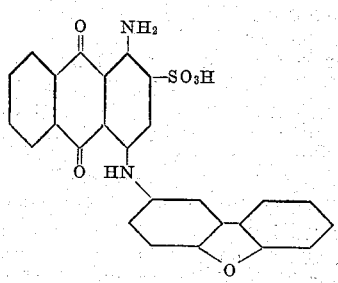

*Example 2.*—5 parts of 3-amino-2-methoxy-dibenzofuran are employed in place of the 2-amino-dibenzofuran in the foregoing example, the procedure being otherwise the same.

The resulting product is a green-blue crystalline solid which dyes silk, wool and nylon from acid and neutral dye baths strong, uniform green shades, which possess excellent fastness to light and washing. In the form of the free sulfonic acid, it corresponds with the formula:

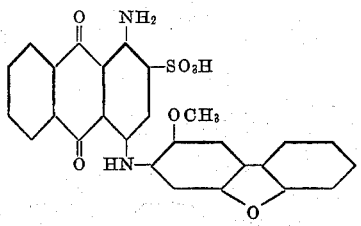

*Example 3.*—To a mixture of 5 parts of 3-amino-dibenzo-furan, 175 parts of water and 110 parts of diethyleneglycol, previously heated to 80°, are added 55 parts of 10% aqueous sodium carbonate, 0.5 part of cuprous chloride, and 10 parts of sodium 1-amino-4-brom-anthraquinone-2-sulfonate. The resulting reaction mass is stirred at 80° to 85°, with heating until no further color change is observed (a period of about 7 hours). During the first few hours, 1 part of cuprous chloride is added to the reaction mass in 5 equal portions at equal intervals. After cooling, the reaction mixture is diluted with 300 parts of water and rendered acid to Congo red paper with hydrochloric acid. The resulting precipitate of the desired coloring matter is filtered off at about 80°. The filter cake is washed with about 1000 parts of warm (60°) 1 per cent hydrochloric acid, and thereafter with hot (80°) water until a colorless filtrate is obtained. The resulting filter cake is boiled with 500 parts of water, and the hot mixture is made slightly alkaline to Brilliant Yellow with aqueous sodium carbonate. The resulting mixture is cooled and salted lightly with common salt to isolate the dyestuff as the sodium salt, which is separated by filtration, washed alternately with warm aqueous solutions of common salt and sodium carbonate (1 per cent and 0.1 per cent concentrations, respectively) until colorless filtrates are obtained, and then dried.

The resulting product, sodium 1-amino-4 (3'-dibenzo - furan) - amino - anthraquinone - 2-sulfonate is a blue crystalline solid which dyes wool, silk and nylon from a neutral dye bath containing sodium sulfate bright blue shades, which possess good strength, clarity, levelness and fastness to light and washing. In the form of the free sulfonic acid, it corresponds with the formula:

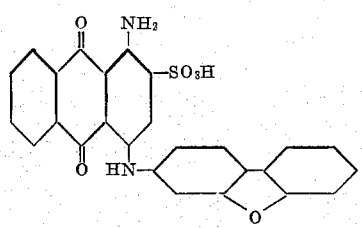

*Example 4.*—To a mixture of 6 parts of 3-amino-dibenzo-furan-8-sulfon-diethylamide, 175 parts of water and 110 parts of diethyleneglycol, previously heated to 80°, are added 55 parts of 10% aqueous sodium carbonate, 0.5 part of cuprous chloride, and 8 parts of sodium 1-amino-4-brom-anthraquinone-2-sulfonate. The resulting reaction mass is further treated in the same manner as the reaction mass in Example 3.

The resulting product, sodium 1-amino-4 (3'-dibenzo-furan-8'-sulfon-diethylamide) amino-anthraquinone-2-sulfonate, is a blue crystalline solid which dyes wool, silk and nylon from a neutral dye bath uniform blue shades of good strength, brilliance and fastness to light and washing. In the form of the free sulfonic acid it corresponds with the formula:

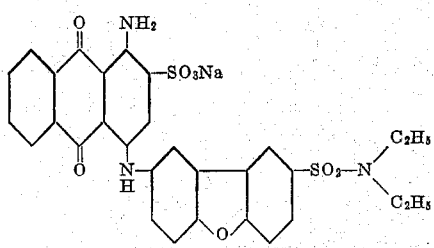

*Example 5.*—The procedure described in Example 3 is employed, but with 5 parts of 3-amino-carbazole substituted for the 3-amino-dibenzo-furan.

The resulting product is a greenish-blue crystalline solid which dyes wool, silk and nylon from acid and neutral dye baths strong bluish-green shades of good levelness and fastness properties. In the form of the free sulfonic acid, it corresponds with the formula:

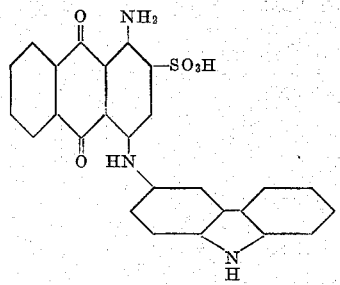

*Example 6.*—5 parts of 3,6-diaminocarbazole are dissolved in 85 parts of diethyleneglycol at about 50°. To the resulting solution are added 20 parts of urea, 125 parts of a 10% aqueous solution of sodium carbonate, 0.5 part of cuprous chloride, and 125 parts of water, and the mass is agitated until homogeneous. 27.5 parts of "bromamine acid" (containing 88% of sodium 1-amino - 4 - bromanthraquinone-2-sulfonate) are introduced into the batch, which is then heated with agitation to 75° and agitated for 5 hours at that temperature until condensation is complete. During the first four hours of said period of condensation 2.5 parts of cuprous chloride are added in portions. The resulting reaction mass is diluted with 300 parts of water, rendered acid to Congo red paper with hydrochloric acid, heated to 80°, and filtered at that temperature. The filter cake is washed twice with 500 parts of warm (60°) 1% hydrochloric acid, and then with hot (80°) water until the filtrate is substantially colorless. The filter cake is suspended in 1500 parts of water, and the slurry is heated to boiling, cooled to 80°, and aqueous sodium carbonate is added until the mixture is alkaline to Brilliant Yellow paper. The mixture is then allowed to cool slowly to room temperature while adding a small amount of common salt to promote crystallization. The resulting crystals of dyestuff are filtered off, washed with a slightly alkaline 1% solution of sodium chloride until the filtrate is colorless, and dried.

The dyestuff thus obtained is a blue-green crystalline solid, which dyes wool, silk and nylon from acid and neutral dye baths blue-green shades, which are bluer than, but otherwise similar in properties to, the shades obtained with the dyestuff of Example 5. In the form of the free sulfonic acid, the dyestuff corresponds with the following formula:

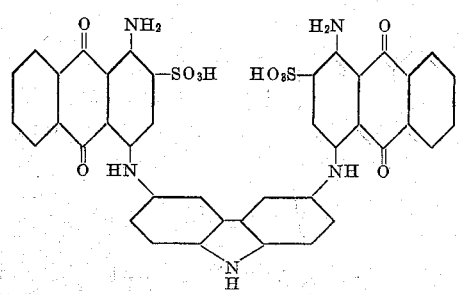

*Example 7.*—6 parts of 2,7-diamino-3,6-dimethylcarbazole are employed in place of the 3,6-diaminocarbazole in Example 5, the procedure being otherwise the same.

The resulting product (disodium salt) is a blue solid which dyes wool, silk and nylon from acid and neutral dye baths blue-green shades. In the form of the free sulfonic acid it is represented by the formula:

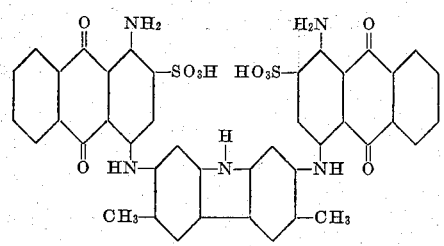

*Example 8.*—A mixture of 40 parts of 1-amino-4-bromo-anthraquinone-2-carboxylic acid, 37 parts of 3-amino-dibenzo-furan, 30 parts of soda ash, 4 parts of copper sulfate, 2 parts of cuprous chloride, and 500 parts of water is heated to 90° to 95° until foaming subsides (about 1 hour), and is then refluxed for about 4 hours to complete the condensation. After cooling to room temperature, the reaction mass is filtered. The filter cake is washed with a cold 5% aqueous solution of sodium chloride, and then stirred into a mixture of 1000 parts of water and 175 parts of 20° Bé. hydrochloric acid. The resulting slurry is heated to 90° to 95°, agitated at that temperature for one hour, and filtered hot, and the filter cake is washed free from acid with hot water. The cake of crude dyestuff thus obtained is slurried with 3000 parts of hot water, and the mixture is rendered alkaline to Brilliant Yellow with soda ash. The mass is then filtered at 85° and the filter cake is washed with hot water until a colorless filtrate is obtained. The combined filtrates are cooled to room temperature and salted with common salt to precipitate the dyestuff, which is separated by filtration, washed with cold water and dried.

The resulting product, the sodium salt of 1-amino - 4(3'-dibenzofuran) - amino - anthraquinone-2-carboxylic acid, is a blue crystalline solid, which is somewhat less soluble in hot and cold water, but exhausts more completely from a neutral dye bath, than the corresponding dyestuff of Example 3. It dyes nylon from a neutral dye bath blue shades, which possess good strength, uniformity and fastness properties, and are brighter than dyeings similarly obtained with the corresponding sulfonic acid dyestuff of Example 3. In the form of the free carboxylic acid, the dyestuff corresponds with the formula:

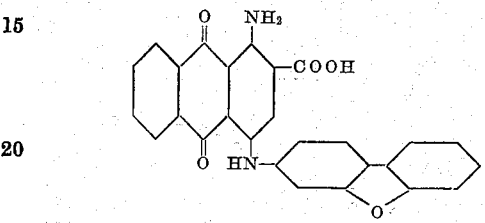

It will be realized by those skilled in the art that the invention is not limited to the details of the foregoing examples and that changes can be made without departing from the scope of the invention.

Thus, instead of the "bromamine acid" and 1-amino-4-bromo-anthraquinone-2-carboxylic acid employed in the above examples, other anthraquinone-sulfonic and -carboxylic acids, or mixtures thereof, having an amino radical in the 1-position and a halogen atom in the 4-position may be employed, for example:

1-amino-4-chloro-anthraquinone - 2 - carboxylic acid
1-amino-4-chloro-anthraquinone-2-sulfonic acid
1-methylamino-4-bromo-anthraquinone - 2 - sulfonic acid
1-methylamino-4-bromo-anthraquinone - 2 - carboxylic acid
1-dimethylamino-4-bromo-anthraquinone-2-sulfonic acid
1-ethylamino-4-bromo-anthraquinone-2-sulfonic acid
1-benzylamino-4-bromo-anthraquinone - 2 - sulfonic acid
1-phenylamino-4-bromo-anthraquinone - 2 - sulfonic acid
1-cyclohexylamino-4-bromo - anthraquinone - 2 - sulfonic acid
1-alpha-furfurylamino-4-bromo-anthraquinone-2-sulfonic acid
1-dibenzofuranamino - 4 - bromo-anthraquinone-2-sulfonic acid
1-hydroxyethylamino - 4 - bromo-anthraquinone-2-sulfonic acid
1-amino-2,4-dibromo-anthraquinone - 5 - sulfonic acid
1-amino-2,4-dibromo-anthraquinone - 6 - sulfonic acid
1-amino-2,4-dibromo-anthraquinone - 7 - sulfonic acid
1-amino-2,4-dibromo-anthraquinone - 8 - sulfonic acid
1-amino-4-bromo-anthraquinone - 2,5 - disulfonic acid
1-amino-4-bromo-anthraquinone - 2,6 - disulfonic acid
1-amino-4-bromo-anthraquinone - 2,7 - disulfonic acid
1-amino-4-bromo-anthraquinone - 2,8 - disulfonic acid Further, instead of the amino heterocyclic o-biphenylenes employed in the above examples or the modifications thereof referred to above, other amino heterocyclic o-biphenylenes may be employed, for example:

3-amino-2-ethoxy-dibenzofuran
3-amino-2-methoxy-7-methyl-dibenzofuran
3-amino-2,7-dimethoxy-dibenzofuran
3-amino-2-methoxy-7-chloro-dibenzofuran
1-amino-dibenzofuran
4-amino-dibenzofuran
3-amino-4-methoxy-dibenzofuran
2,7-diamino-3,6-dimethoxy dibenzofuran
4-amino-6,7,8,9-tetrahydro-dibenzofuran
2-aminocarbazole-7-sulfonic acid
3-amino-N-ethyl-carbazole
2-amino-dibenzothiophene
4-amino-biphenyl-2,2'-sulfone
2-aminocarbazole-7-sulfon-N-methylanilide

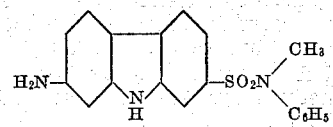

1-amino-carbazole-3,6,8-trisulfonhexaethyltriamide

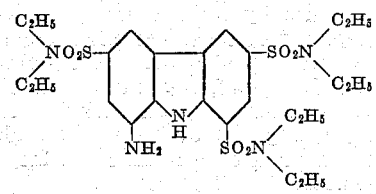

While the condensation is preferably carried out at temperatures of about 70° to about 100° C., and especially at temperatures of 75° to 85° C., other temperatures may be used; for example, temperatures between 60° and 115° C.

The dyestuffs of the present invention may be employed in conjunction with diluents and assistants (such as, dextrine, sugars, sodium chloride, sodium hexametaphosphate), dispersing agents (e. g., higher alkyl aryl sulfonates, diarylmethane sulfonates, etc.), and they may be marketed in the form of powdered compositions comprising mixtures of said dyestuffs with diluents and/or assistants and/or dispersing agents.

The sodium salts of those dyestuffs of the present invention which contain only one water-solubilizing group (namely, a carboxyl group or a sulfonic acid group) in the molecule are particularly suited for dyeing nylon from a neutral dye bath, but they are difficultly soluble in cold water and only moderately soluble in hot water and hot dye baths. Their dissolution or dispersion in cold and hot water can be improved and dyeing facilitated by adding a small amount (1% to 5%, or more, based on the weight of the dyestuff) of a dispersing agent (e. g., a formaldehyde condensation product of naphthalene sulfonic acid, "Tamol NNO", a mixture of alkyl benzene sodium sulfonates derived from kerosene, etc.) to such dyestuffs (as well as to other dyestuffs of this invention).

I claim:

1. Anthraquinone acid dyestuffs of the 1,4-diamino-anthraquinone acid class, said dyestuffs having an amine radical in the 1-position of the anthraquinone nucleus and an amino heterocyclic o-biphenylene radical in the 4-position of the anthraquinone nucleus, said dyestuffs being, in the form of the sodium salts, blue to green solids, soluble in water, and dyeing animal fibers and nylon from acid and neutral dye baths in level, bright blue to green shades.

2. Anthraquinone acid dyestuffs of the 1,4-diamino-anthraquinone acid class, said dyestuffs, in the free acid form, corresponding with the formula:

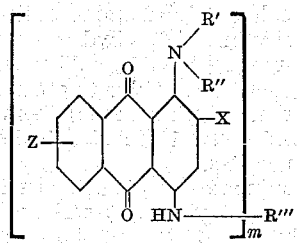

wherein R' is a member selected from the class consisting of hydrogen and alkyl, aralkyl, cycloalkyl, aryl, hydroaryl, and heterocyclic radicals, R" is a member selected from the class consisting of hydrogen and alkyl, aralkyl, cycloalkyl, aryl, hydroaryl, and heterocyclic radicals, X is a member selected from the class consisting of halogen, the carboxyl group and the sulfonic acid group, Z is a member selected from the class consisting of hydrogen, the carboxyl group and the sulfonic acid group, at least one of X and Z being a carboxyl group or a sulfonic acid group, $m$ is one of the integers 1 and 2, and R''' is a member selected from the class consisting of heterocyclic o-biphenylene radicals corresponding with the following formula and their alkyl, alkoxy, aryl, halogen, and sulfo derivatives, attached through a nuclear carbon atom of the heterocyclic o-biphenylene radical to the nitrogen atom of the amino group represented by HN—:

wherein Y is a member of the class consisting of O, S, NH, N-alkyl, SO₂ and SO, said dyestuffs being, in the form of the sodium salts, blue to green solids, soluble in water, and dyeing animal fibers and nylon from acid and neutral dye baths in level, bright blue to green shades.

3. Anthraquinone sulfonic acid dyestuffs of the 1,4-diamino-anthraquinone sulfonic acid class, said dyestuffs having an amine radical in the 1-position of the anthraquinone nucleus, an amino heterocyclic o-biphenylene radical in the 4-position of the anthraquinone nucleus, and a sulfonic acid radical at least in the 2-position of the anthraquinone nucleus, said dyestuffs being, in the form of the sodium salts, blue to green solids, soluble in water, and dyeing animal fibers and nylon from acid and neutral dye baths in level, bright blue to green shades.

4. Anthraquinone sulfonic acid dyestuffs of the 1,4-diamino-anthraquinone-2-sulfonic acid class in which a hydrogen atom of the 4-amino group is replaced by a heterocyclic o-biphenylene radical, said dyestuffs being, in the form of the sodium salts, blue to green solids, soluble in water, and dyeing animal fibers and nylon from acid and neutral dye baths in level, bright blue to green shades.

5. Anthraquinone sulfonic acid dyestuffs which are sodium salts of 1,4-diamino-anthraquinone-2-sulfonic acids in which a hydrogen atom of the 4-amino group is replaced by a heterocyclic o-biphenylene radical, said dyestuffs being blue to green solids, soluble in water, and dyeing animal fibers and nylon from acid and neutral dye baths in level, bright blue to green shades.

6. Anthraquinone sulfonic acid dyestuffs which are sodium salts of 1,4-diamino-anthraquinone-2-sulfonic acids in which a hydrogen atom of the 4-amino group is replaced by a dibenzofuran radical, said dyestuffs being blue to green solids, soluble in water, and dyeing animal fibers and nylon from acid and neutral dyebaths in level, bright blue to green shades.

7. Anthraquinone sulfonic acid dyestuffs of the 1,4-diamino-anthraquinone-2-sulfonic acid class in which a hydrogen atom of the 4-amino group is replaced by a heterocyclic o-biphenylene radical which contains no water-solubilizing group, said dyestuffs being, in the form of the sodium salts, blue to green solids, soluble in water, and dyeing animal fibers and nylon from acid and neutral dye baths in level, bright blue to green shades.

8. Anthraquinone sulfonic acid dyestuffs of the 1,4-diamino-anthraquinone sulfonic acid class, said dyestuffs having an amine radical in the 1-position of the anthraquinone nucleus and an amino heterocyclic o-biphenylene radical containing an oxygen atom in the heterocyclic nucleus, in the 4-position of the anthraquinone nucleus, said dyestuffs being, in the form of the sodium salts, blue to green solids, soluble in water, and dyeing animal fibers and nylon from acid and neutral dye baths in level, bright blue to green shades.

9. Anthraquinone sulfonic acid dyestuffs of the 1,4-diamino-anthraquinone-2-sulfonic acid class in which a hydrogen atom of the 4-amino group is replaced by a dibenzofuran radical, said dyestuffs being, in the form of the sodium salts, blue to green solids, soluble in water, and dyeing animal fibers and nylon from acid and neutral dye baths in level, bright blue to green shades.

10. Anthraquinone sulfonic acid dyestuffs of the 1,4-diamino-anthraquinone-2-sulfonic acid class in which a hydrogen atom of the 4-amino group is replaced by the dibenzofuran radical, said dyestuffs being, in the form of the sodium salts, blue solids, soluble in water, and dyeing animal fibers and nylon from acid and neutral dye baths in level, bright blue shades.

11. Anthraquinone sulfonic acid dyestuffs which are 1-amino-4 (3'-dibenzofuran)-amino-anthraquinone-2-sulfonates, said dyestuffs being, in the form of the sodium salt, a blue crystalline solid which dyes wool, silk and nylon from a neutral dye bath containing sodium sulfate bright blue shades which possess good strength, clarity, levelness and fastness to light and washing.

12. Anthraquinone carboxylic acid dyestuffs of the 1,4-diamino-anthraquinone carboxylic acid class, said dyestuffs having an amine radical in the 1-position of the anthraquinone nucleus, an amino heterocyclic o-biphenylene radical in the 4-position of the anthraquinone nucleus, and a carboxyl radical at least in the 2-position of the anthraquinone nucleus, said dyestuffs being, in the form of the sodium salts, blue to green solids, soluble in water, and dyeing animal fibers and nylon from acid and neutral dye baths in level, bright blue to green shades.

13. Anthraquinone carboxylic acid dyestuffs of the 1,4-diamino-anthraquinone-2-carboxylic acid class in which a hydrogen atom of the 4-amino group is replaced by a heterocyclic o-biphenylene radical, said dyestuffs being, in the form of the sodium salts, blue to green solids, soluble in water, and dyeing animal fibers and nylon from acid and neutral dye baths in level, bright blue to green shades.

14. Anthraquinone carboxylic acid dyestuffs of the 1,4-diamino-anthraquinone-2-carboxylic acid class in which a hydrogen atom of the 4-amino group is replaced by a heterocyclic o-biphenylene radical which contains no water-solubilizing group, said dyestuffs being, in the form of the sodium salts, blue to green solids, soluble in water, and dyeing animal fibers and nylon from acid and neutral dye baths in level, bright blue to green shades.

15. Anthraquinone carboxylic acid dyestuffs of the 1,4-diamino-anthraquinone carboxylic acid class, said dyestuffs having an amine radical in the 1-position of the anthraquinone nucleus and an amino heterocyclic o-biphenylene radical containing an oxygen atom in the heterocyclic nucleus, in the 4-position of the anthraquinone nucleus, said dyestuffs being, in the form of the sodium salts, blue to green solids, soluble in water, and dyeing animal fibers and nylon from acid and neutral dye baths in level, bright blue to green shades.

16. Anthraquinone carboxylic acid dyestuffs of the 1,4-diamino-anthraquinone-2-carboxylic acid class in which a hydrogen atom of the 4-amino group is replaced by the dibenzofuran radical, said dyestuffs being, in the form of the sodium salts, blue solids, soluble in water, and dyeing animal fibers and nylon from acid and neutral dye baths in level, bright blue shades.

JEAN G. KERN.

Certificate of Correction

Patent No. 2,407,704.  September 17, 1946.

JEAN G. KERN

It is hereby certified that errors appear in the printed specification of the above numbered patent requiring correction as follows: Column 3, line 39, for "rdical" read *radical*; column 6, lines 21 to 25 inclusive, Example 4, for that portion of the formula reading

and that the said Letters Patent should be read with these corrections therein that the same may conform to the record of the case in the Patent Office.

Signed and sealed this 24th day of December, A. D. 1946.

[SEAL]

LESLIE FRAZER,
*First Assistant Commissioner of Patents.*